Sept. 27, 1960 B. M. LITTLEHALE 2,953,956
ROD CUTTING APPARATUS WITH ADJUSTABLE GUIDE
MEANS FOR SUPPORTING THE ROD TO BE CUT
Filed March 14, 1957 3 Sheets-Sheet 1

INVENTOR.
BRADNER M. LITTLEHALE
BY
Harry Radzinsky
ATTORNEY

Sept. 27, 1960   B. M. LITTLEHALE   2,953,956
ROD CUTTING APPARATUS WITH ADJUSTABLE GUIDE
MEANS FOR SUPPORTING THE ROD TO BE CUT
Filed March 14, 1957   3 Sheets-Sheet 2
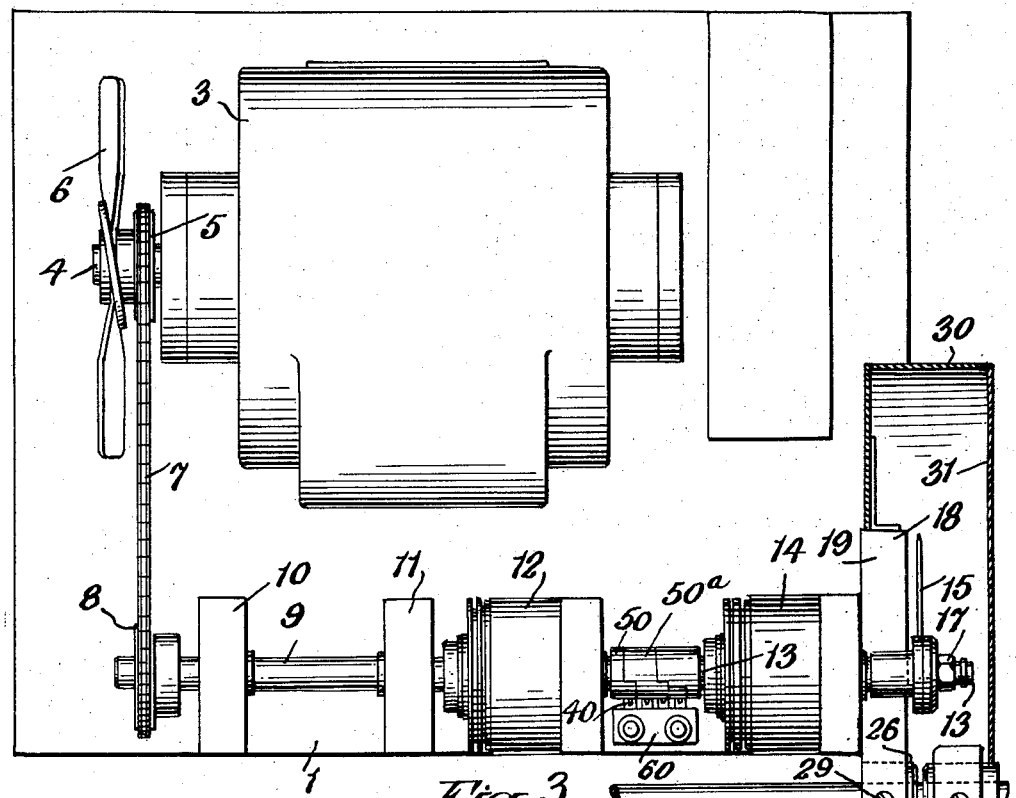
Fig. 3.
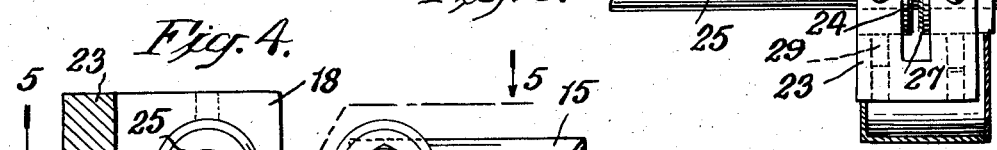
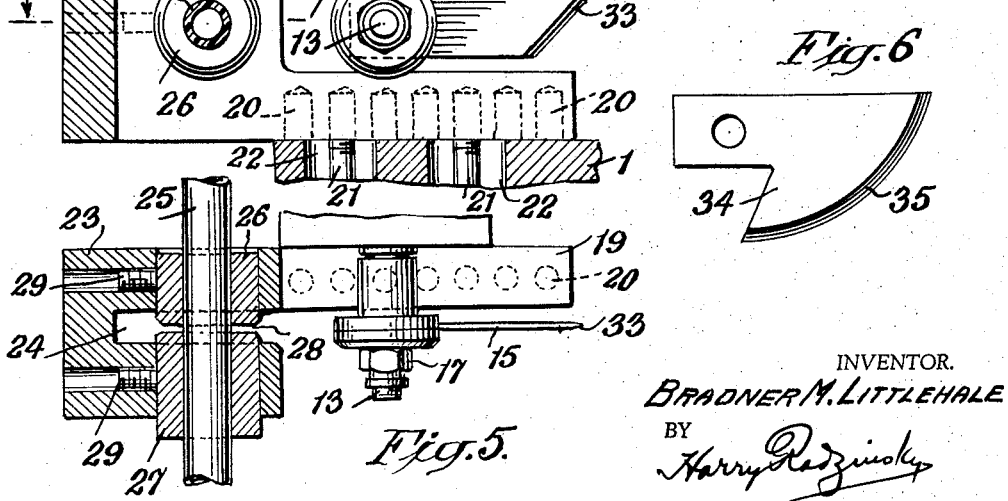
Fig. 4.
Fig. 6.
Fig. 5.
INVENTOR.
BRADNER M. LITTLEHALE
BY
Harry Radzinsky
ATTORNEY

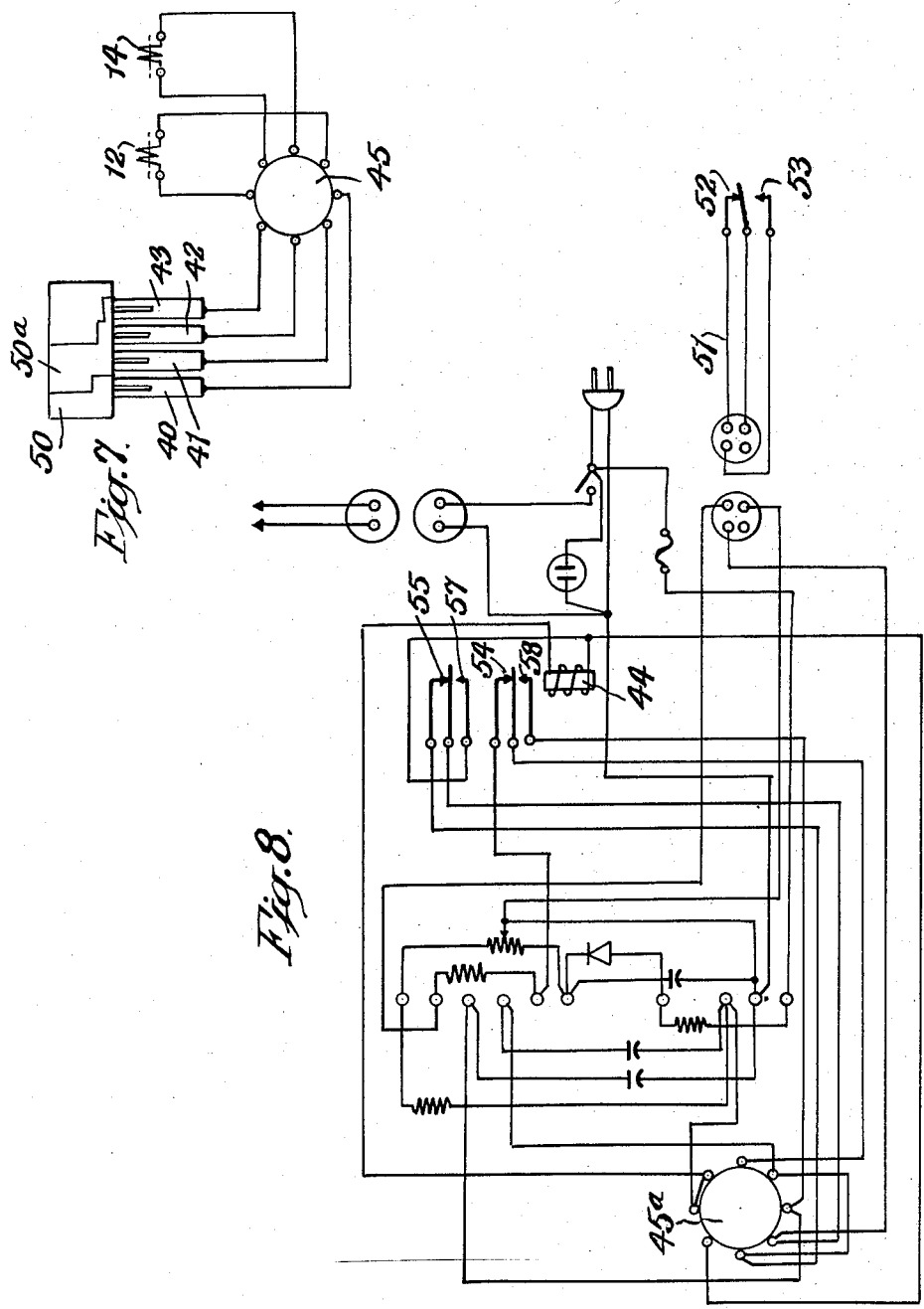

United States Patent Office 2,953,956
Patented Sept. 27, 1960

2,953,956

ROD CUTTING APPARATUS WITH ADJUSTABLE GUIDE MEANS FOR SUPPORTING THE ROD TO BE CUT

Bradner M. Littlehale, Chatham, N.J., assignor to Foster & Allen, Inc., Garwood, N.J., a corporation of New Jersey Filed Mar. 14, 1957, Ser. No. 646,126

3 Claims. (Cl. 83—444)

This invention relates to cutting devices, and more particularly to an apparatus for severing rods, tubing or other plastic, rubber or other material into desired lengths.

It is an object of the invention to provide an apparatus of this character which shall be of relatively simple construction and in which the material to be cut may be delivered directly from an extruder or other feeding device, and will be cut off accurately into lengths of desired size. It is an object of the invention to provide a machine of this character which shall be adjustable to vary the lengths cut; which shall have means by which the cutting of both relatively large and small-diameter materials may be best performed; which can be caused to operate both intermittently or continuously and which shall have other advantages making it particularly useful for the cutting of the material above specified in a clean, speedy and accurate manner.

More particularly, the invention contemplates the provision of a guide means, including spaced-apart, tubular guide elements, with a rotated knife or cutter blade operative between the guide elements to thereby sever the material passing therethrough; of means by which the blade is intermittently rotated at predetermined times to gauge the length of the continuously-moving material to be cut; of means by which the blade may be continuously operated, and of means by which the guiding elements are adjustable relatively to the cutter to thereby secure best cutting results according to the nature of the material being severed.

With these, and other objects to be hereinafter set forth in view, I have devised the arrangement of parts to be described and more particularly pointed out in the claims appended hereto.

In the accompanying drawings, wherein an illustrative embodiment of the invention is disclosed, Fig. 1 is an elevational view of a cutting apparatus as constructed according to the invention with a portion of the housing broken away and shown in section;

Fig. 3 is a top plan view of the apparatus with the housing broken away and sectioned;

Fig. 4 is an enlarged end view, with parts in section, of the cutting elements;

Fig. 5 is a sectional view, taken substantially on the line 5—5 of Fig. 4, looking in the direction of the arrows;

Fig. 6 shows a modified form of cutter.

Fig. 7 is an electrical diagram, showing the commutator and associated parts, and Fig. 8 is an electrical diagram for the apparatus.

Figure 1:
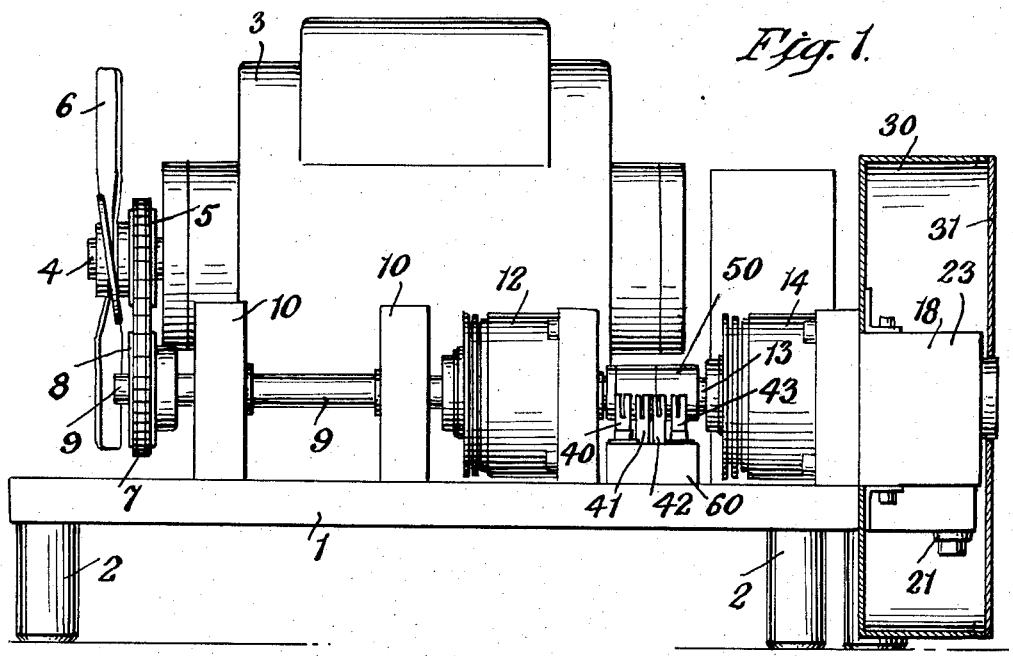
Figure 2:
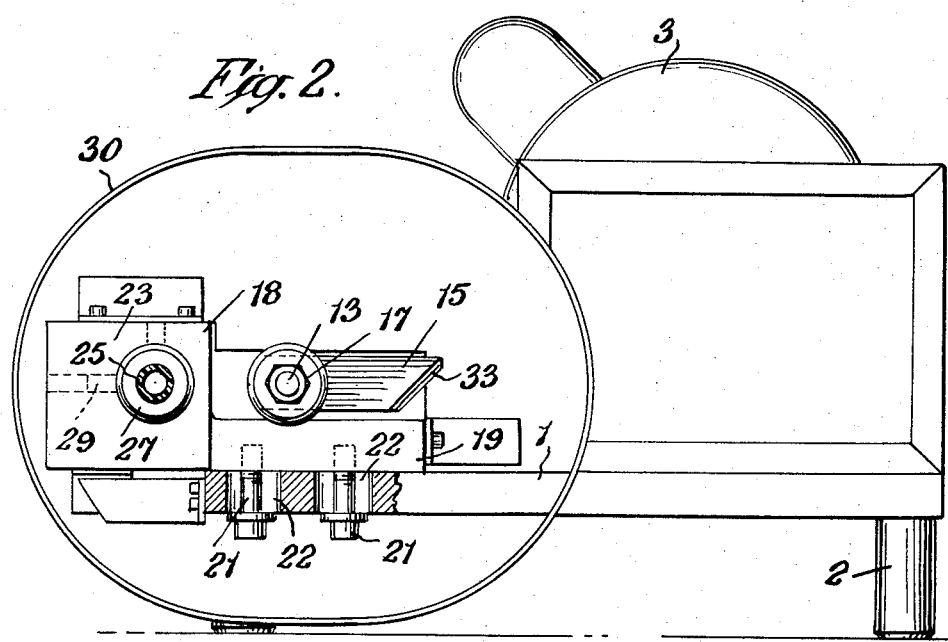
Fig. 2 is an end elevational view of the same, looking from the right of Fig. 1 and with the cover plate of the cutter housing removed to disclose construction with portions broken away and shown in section.

Referring to the drawings, 1 indicates a base member, table or other supporting element for the parts of the apparatus, and the same is supported on legs shown at 2.

Mounted on the top of the base 1 is an electric motor 3 having a shaft 4 carrying a sprocket 5 and also carrying a fan 6 for cooling of the motor. A drive chain 7 extends from the sprocket 5 and engages a sprocket 8 secured on a shaft 9 rotatively mounted in the spaced bearing members 10 and 11 mounted on the base 1. At 12 is shown an electrically-operated clutch, operative at predetermined times, to couple the shaft 9 to a co-axial cutter shaft 13. The cutter shaft 13 extends through an electrically-operated brake 14 and has an end extending beyond the same, and on said extended end portion is provided a cutter or knife-blade shown at 15. The cutter or blade 15 is maintained on the shaft 13 by means of the nut 17 or equivalent fastening means by which the cutter is securely held on the shaft and is rotated by the rotative movement of the shaft 13.

The guide for the plastic tubing, rod or other elongated material to be cut into predetermined lengths, is shown at 18 and the same includes an arm 19 provided with a plurality of spaced, threaded recesses 20 (Fig. 4) adapted to selectively receive fastening screws or bolts 21 which extend through slots 22 provided in the base 1.

At one end the guide 18 is provided with a head 23 having a slot 24 through which the rotating blade 15 is moved during the cutting operation. The rod, tubing or other material to be severed is indicated at 25 and as it leaves an extruding apparatus it passes through two axially-aligned bushings 26 and 27 secured in spaced-apart relation in the bifurcated portion of the head 23, as seen in Figs. 3 and 5. These bushings 26 and 27 are spaced apart as indicated at 28 (Fig. 5) to allow the cutter or blade 15 to pass between them and through the space and sever the rod, tubing or other material 25 at the point located in the space 28. The bushings 26 and 27 are axially adjustable either toward or away from one another to thereby vary the spacing 28 between them and they can be maintained in any desired spaced-apart relation by means of the set screws 29. A protective housing 30 surrounds the cutter and the guide means and is carried by the guide member 18, said housing being closed at one end by a removable plate 31.

In the operation of the apparatus, the usual method of delivering the rod, tubing or other extruded material to the cutter is by way of a moving belt conveyor. Adjacent to the cutting apparatus is provided a weighted roller which engages against the rod, tubing or other material, and forces the same forwardly through the bushings 26 and 27 to be cut by the cutter or blade 15. This feeding means is illustrative of one way in which the material may be delivered to the cutter and is not shown herein since it forms no part of the present invention.

The cutter or blade 15 is relatively thin and is preferably, although not necessarily, arranged to make a single revolution and then stop. The gap or spacing 28 between the ends of the bushings 26 and 27 is only slightly wider than the thickness of the blade 15, and which is usually less than $\frac{1}{32}$ of an inch. The material that is moved through the bushings 26 and 27 and severed into the required lengths is continuously fed by the feeding means above described or by any other suitable feeding apparatus which will assure uniform, continuous feed of the material to the cutter. As each piece is cut off by the knife edge 33 of the cutter, the severed piece is ejected from the bushing 27 by being pushed therefrom by the portion of the rod or tubing that follows behind it. The opposed faces of the bushings serve to guide and support the thin cutting blade as it passes through the gap 28 to insure the securement of a smooth, even cutting operation. However, while two bushings are shown, one may be used and in such a case a thicker and stiffer cutting blade is employed against the end of the single bushing.

By means of the adjustable mounting of the cutting guide block 18, the bushings 26 and 27 can be moved toward or away from the cutter. Thus, when it is desired to cut heavy rod or tubing, the bushings and the tubing or rod passing therethrough, may be positioned relatively close to the knife to thereby secure maximum torque. Smaller tubing, requiring less torque to cut, is usually extruded at higher speeds and hence the guide 18 is spaced farther away from the cutter so that the knife may pass through the tubing quickly. This speed in cutting is desirable since air is often passed through the tubing as part of the extruding operation and it is necessary for this air to escape through the end of the tubing. If the knife 15 should operate to bar the escape of the air it might cause a bubble to form at the extruder nozzle where the plastic material is still in semi-liquid state. Secondly, a slow-moving knife may delay the travel of the tubing to such an extent as to cause the tubing to bend before entering the bushings, thus allowing fouling of the feed. Therefore, for small-diameter tubing or rod the bushings 26 and 27 are spaced away from the knife to secure maximum peripheral speed. With a properly designed knife, cutting is accomplished in less than .001 second.

In Figs. 1, 3 and 5 the cutter blade or knife is shown with an inclined cutting edge 33. Another type of blade is shown at 34 in Fig. 6, wherein the cutting edge 35 is of curved or arcuate form. Various other types of blade may be used for different cutting requirements.

The electrically-operated clutch shown at 12 is of known construction and includes a clutch armature constantly revolving at approximately 1150 r.p.m. At the proper time, the clutch is energized and the clutch armature drives a rotor on the shaft 13 to rotate the knife for a single revolution. As soon as the knife has passed through the tubing 25, the clutch is released and the brake 14 is energized to halt the rotative movement of shaft 13. The knife will come to a halt within 90° to 140° after cutting.

Mounted on the shaft 13 is a commutator 50 having four contact brushes indicated respectively at 40, 41, 42 and 43, carried by the insulating block 60, and which brushes control the operation of the clutch, brake and a high speed relay shown at 44. The brush controlling the brake is that indicated at 40; that controlling the operation of the clutch is shown at 42; that controlling the relay 44 is shown at 43; that shown at 41 conveys positive current. The leads from the four contact brushes extend to an octal plug 45 adapted for reception in an octal socket 45a. The high speed relay 44 makes it possible to start rotation of the cutter shaft 13 from a position which is normally under full braking. The relay also serves to provide a light braking current between cycles, without which the residual magnetism in the clutch would cause continuous knife rotation. When a cut is required, a micro switch 51 or other intermittently-opened and closed contactor is moved from pole 52 to pole 53. This cuts off the light holding-current which has been flowing to the brake 14 through the normally-closed contact 54 of the relay 44. Then through pole 53 and the normally-closed contact 55 of the relay 44, the current flows directly to the clutch 12, causing the knife blade, shaft 13 and commutator 50 thereon, to rotate.

When the commutator has rotated approximately ninety degrees, the brake-energizing brush 40 leaves the copper contact segment 50a of the commutator, as seen in Fig. 7 and after another 1/16″ rotation of the commutator, the clutch-energizing brush 42 makes contact with the segment 50a. The next 1/32″ of rotation of the commutator brings the relay brush 43 into contact with the segment and the relay then closes. When a total rotation of about half a turn has been made, the clutch brush 42 and relay brush 43 leave the segment and the clutch 12 is de-energized. The relay 44 remains closed however, because it is energized through the contact indicated at 57. Another 1/16″ rotation of the commutator brings the brake-energizing brush 40 back into contact with the segment 50a, and the brake is energized with full current through contact 58, stopping rotation of shaft 13 with the brush still in contact. When the external micro switch or other contactor is moved back again from contact 53 to contact 52, the brake 14 is released and relay 44 opens restoring the light holding-current to the brake to prevent undesired rotation of shaft 13.

If desired, the apparatus may be readily changed from intermittent clutch-brake operation to continuous rotation of the knife while the clutch is constantly engaged. This is accomplished by maintaining the four brushes 40 to 43 inclusive from contacting the commutator 50. This makes possible the cutting of very short lengths of the tubing or rod. These lengths can be varied by altering the speed at which material is fed into the cutter or by changing the speed of the cutter drive motor.

From the foregoing, the operation of the device will be apparent. The rod, tubing or other extruded plastic material is continuously fed through the two aligned bushings 26 and 27 and at predetermined intervals, or continuously as above pointed out, the knife will be rotated and pass through the gap 28 to sever the tubing, rod or other extruded material with a smooth, rapid cutting operation.

While I have herein shown the cutting blade mounted on shaft 13, greater torque on a cutter blade and carrying shaft can be secured if the cutting blade is mounted on a shaft driven by reduction gearing from shaft 13 and shaft 13 is thus used as an intermediate shaft between the drive shaft 9 and that which carries the cutter blade. In such case, the commutator would be mounted on the cutting blade shaft rather than on shaft 13. Shaft 13 would in such construction, make several revolutions to one revolution of the cutting-blade shaft.

While I have herein described a single embodiment of the invention, it is obvious that the same is not to be restricted thereto, but is broad enough to cover all structures coming within the scope of the annexed claims.

What I claim is:

1. A cutting apparatus of the character described comprising, horizontally-arranged guide means through which an elongated element to be cut is continuously moved and by which it is supported, said guide means having a support member including parts defining a slot between them, said slot being closed at one end, a pair of bushings held in said support member and arranged in axial alignment for axially surrounding and supporting the material to be cut, each bushing having an end projecting into the slot, the ends of the bushings in said slot defining a gap between them of less width than the slot, said spacing forming a passage for a cutter blade, the bushings being axially adjustable to and from one another to thereby regulate the width of the gap between them, a rotatable shaft supported on a base member, a single, thin-bladed cutter blade carried by the shaft and projecting radially from the shaft and movable therewith between said bushings for lateral support thereby, said cutter blade having a knife edge that is moved through the gap to thereby contact with and sever the element to be cut, and means for securing the support member on said base member in a selected lateral position relative to the axis of rotation of said cutter shaft for adjusting the guide bushings radially with respect to said cutter shaft.

2. The structure of claim 1; and electrically controlled brake means engaging the shaft and including means for controlling the revolutions thereof.

3. The structure of claim 1; wherein said means for securing said support member on said base member comprises aperture portions receiving block bolts therethrough.

(References on following page)

References Cited in the file of this patent

UNITED STATES PATENTS

| | | |
|---|---|---|
| 432,565 | Ritchie | July 22, 1890 |
| 1,153,183 | Aicher | Sept. 14, 1915 |
| 1,507,735 | Holt | Sept. 9, 1924 |
| 2,121,997 | Tikalsky | June 28, 1938 |
| 2,217,766 | Neff | Oct. 15, 1940 |
| 2,466,587 | Genovese | Apr. 5, 1949 |
| 2,491,363 | Dehn | Dec. 13, 1949 |
| 2,494,037 | Dear | Jan. 10, 1950 |
| 2,519,201 | Seidman | Aug. 15, 1950 |
| 2,519,695 | Olsson | Aug. 22, 1950 |
| 2,600,667 | Mason | June 17, 1952 |
| 2,609,875 | Zuck | Sept. 9, 1952 |